| United States Patent [19] | [11] | 4,303,692 |
|---|---|---|
| Gaull | [45] | Dec. 1, 1981 |

[54] INFANT MILK FORMULA

[76] Inventor: Gerald E. Gaull, 1107 Fifth Ave., New York, N.Y. 10028

[21] Appl. No.: 90,639

[22] Filed: Nov. 2, 1979

Related U.S. Application Data

[63] Continuation of Ser. No. 963,026, Nov. 22, 1978, abandoned, which is a continuation of Ser. No. 738,080, Nov. 22, 1976, abandoned.

[51] Int. Cl.³ .............. A23C 11/00; A23C 21/00; A23J 1/14; A23J 1/20
[52] U.S. Cl. .................. 426/580; 426/2; 426/583; 426/590; 426/634; 426/656; 426/801
[58] Field of Search .............. 426/2, 590, 71, 580, 426/583, 801, 656, 634; 424/177, 319, 335, 115

[56] References Cited

U.S. PATENT DOCUMENTS

| 3,231,385 | 1/1966 | Ziro et al. | 426/71 |
| 3,636,195 | 1/1972 | Monson | 424/115 |
| 3,896,240 | 7/1975 | Gruette et al. | 426/801 X |

OTHER PUBLICATIONS

Armstrong, et al., Free Amino Acids in Milk Chem. Abstr., vol. 60:2135c, 1964.
Sturman et al., Taurine In the Brain and Liver of the Developing Human and Monkey, Journal of Neurochemistry, vol. 25, 1975, (pp. 831–835).

*Primary Examiner*—David M. Naff
*Attorney, Agent, or Firm*—Cooper, Dunham, Clark, Griffin & Moran

[57] ABSTRACT

Synthetic infant formulas which are essentially free of taurine are improved for nourishing infants by adding taurine to the formula. In addition to taurine, there may also be added cholesterol and/or isethionic acid.

15 Claims, No Drawings

INFANT MILK FORMULA

This is a continuation, of application Ser. No. 963,026 filed Nov. 22, 1978 which, in turn, is a continuation of Application Ser. No. 738,080 filed Nov. 22, 1976, both now abandoned.

This invention relates to synthetic infant milk formulas. In one embodiment, this invention relates to improving infant nutrition. In another embodiment, this invention relates to formulas, especially liquid infant milk formulas based on cow milk, particularly in the ready-to-use form.

Synthetic infant milk formulas, particularly synthetic infant milk formulas based on cow milk, have been employed for nourishing infants, i.e. infants having an age not greater than about $12\pm2$ months.

Human milk has an average composition in percentages by weight 87.5 water, 12.5 total solids, 1.0–1.5 protein and non-protein nitrogen compounds, 3.0–4.0 lipids, 7.0–7.5 carbohydrates and 0.2 ash. Cow milk has an average composition in percentages by weight 87 water, 13 total solids, 3.0–4.0 protein, 3.5–5.0 lipids, 3.5–4.0 carbohydrates and 0.7 ash. Also, cow milk is low in taurine, about 4 $\mu$moles percent. With respect to carbohydrates, lactose, the disaccharide of galactose and glucose, occurs both in cow and in human milk and the lipids of human and cow milk are chiefly triglycerides dispersed as very small globules. The fat of cow milk contains all the saturated fatty acids with an even number of carbon atoms from butyric to stearic, with about 10% of the total fat composed of glycerides of lower fatty acids. The principal fatty acids are oleic, 32%; palmitic, 15%; myristic, 20%; stearic, 20%; and lauric, 6%, with small amounts of phospho-lipids and cholesterol being present. On the other hand, human milk fat contains no fatty acids with a molecular weight lower than that of decanoic acid and differs from cow milk in this respect, although the quantities of most of the fatty acids are similar to those of cow milk. Cow milk contains substantially all the known vitamins and is rich in vitamin A and riboflavin, but vitamin C, vitamin D, thiamine, pantothenic acid and niacin are present in small amounts. Pasteurization of cow milk, however, destroys most of the vitamin C. Therefore, additional amounts of vitamins C and D are specially supplied or added to an infant milk formula based on cow milk.

The principal proteins of cow milk are caseins, representing about 82% of the protein nitrogen. When cow milk is centrifuged and the cream skimmed off the top and the remaining fluid, skim milk, acidified, casein is precipitated. The resulting supernatant liquid or fluid is whey which contains about 18% of the total protein in cow milk. The whey proteins appear to be as numerous as those of serum and the principal protein of cow whey is $\beta$-lacto-globulin which amounts to about 50–60% of whey protein. Alpha-lactabumin is one of the two proteins required for lactose synthesis. Other important constituents of cow milk whey are the immonoglobulins which carry the antibodies; these account for about 10% of the whey protein. Human milk contains not only much less protein than cow milk, but the distribution of proteins is different. Caseins account for only about 40% of the proteins in human milk and the whey proteins about 60%.

Because of certain similarities in chemical properties and composition and overall nutritional value of human milk and cow milk, particularly for infant feeding, and because of the usual availability of cow milk, synthetic infant milk formulas based on modified cow milk have been widely used for the nourishment of infants. Infant milk formulas based on cow milk, particularly the protein content or components thereof, have been prepared such that the protein content (about 82% casein and 18% whey in cow milk) has been modified such that the protein content of the formula is 60% whey protein and 40% casein protein. However, infant milk formulas for the nourishment of infants and in ready-to-use form have a low taurine content, e.g. less than about 4 $\mu$moles percent.

Infant milk formulas based on cow milk have been further modified or fortified by the incorporation therein of constituents normally not found in cow milk, either per se or in the concentrations found in cow milk in order to prepare a better source of nourishment for infants. The same approach has been taken with respect to animal feeds, not necessarily feed for new-born animals. For example, U.S. Pat. No. 3,959,519 discloses the fortification of feeds and foods by incorporating therein a methionine source selected from glycyl-D,L-methionine, glycyl-L-methionine, D,L-methionylglycine and L-methionylglycine. U.S. Pat. No. 2,542,723 discloses nutrition compositions which contain a chemical composition biologically equivalent to cystine and methionine, such as the inorganic salts of diacetyl-L-cystine. U.S. Pat. No. 3,415,655 discloses cow milk compositions or products containing methionine and/or tryptophan together with monosodium glutamate and at least one amino acid of the group consisting of glycine, alanine, serine and threonine. Animal feeds containing taurine and fermentation and/or distillers' product as growth promoting materials have been proposed, see U.S. Pat. No. 3,636,195. Infant milk formulas of special composition and their preparation have been the subject of many patents; see, for example, U.S. Pat. Nos. 2,694,640, 3,542,560 and 3,798,339.

It is an object of this invention to provide an improved synthetic infant milk formula, particularly synthetic infant milk formulas based on cow milk.

It is another object of this invention to provide an improved method or program for nourishing infants up to an age of about $12\pm2$ months, more or less.

These and other objects of this invention are achieved in the light of the accompanying disclosure.

Synthetic infant milk formulas, particularly synthetic infant milk formulas based on cow milk and containing taurine in accordance with this invention, have been prepared. In addition to taurine which is incorporated in the synthetic infant milk formula in a minor amount, there may also be incorporated or added to the synthetic infant milk formula isethionic acid and/or cholesterol, also in minor amounts. A synthetic infant milk formula in accordance with this invention would contain taurine in an amount such that when the synthetic infant milk formula is in the form ready-to-use, taurine would be present in an amount or concentration in the range from about 15–20 to about 55–60 $\mu$moles percent, preferably about 30 $\mu$moles percent. Isethionic acid, when present along with taurine in accordance with this invention, would be incorporated or added to the synthetic milk formula in an amount in the range from about 4 to about 25 $\mu$moles percent. Cholesterol, when present either with taurine alone or taurine together with isethionic acid, would be present or added to the synthetic milk formula in an amount in the range from about 20% less to about 20% more than the cholesterol concentration found in human milk. Human milk, in addition to containing cholesterol, is known to contain many free amino acids including taurine, see *Chemical Abstracts,* Vol. 60:2135c.

In the practices of this invention, particularly in the preparation of synthetic milk formulas, especially those based on cow milk, it is preferred that taurine be added or incorporated in the synthetic milk formulas in an amount equivalent to or approximating the taurine content in human milk, about 10–35 μmoles percent.

Although taurine has been known to be present in human milk (about 30 μmoles percent) and in cow milk (about 4 μmoles percent) and is exceeded in concentration only by glutamate, heretofore it has not been incorporated in synthetic infant milk formulas. Cow milk base formulas, particularly casein-predominant synthetic infant milk formulas also contain little cystine, a taurine precursor. It has been observed that infants fed cow milk excrete smaller amounts of taurine than infants fed human milk. It has been observed also that when pre-term infants are fed pooled human milk, lower concentrations of all amino acids in plasma are present than in infants fed casein-predominant formulas, except taurine which is higher. It has also been observed that urinary taurine is highest in infants fed human milk and lowest in infants fed casein-predominant synthetic milk formulas. The activity of cysteine-sulfinic acid decarboxylase (which synthesizes taurine) is very low in fetal and mature human liver. It has also been demonstrated in the rat model that there is a large and rapid transfer of taurine from the mother to the liver and brain of the infant via the milk of the mother. It appears, therefore, that taurine may be essential for the well-being and nourishment of the infant. Purified casein diets fed kittens result in depletion of brain taurine, reduced synthesis of taurocholic acid and retinal disease. Accordingly, it may be that human infants nourished on casein-predominant formulas, particularly pre-term infants, potentially may suffer some of the same effects, at least in part. Accordingly, synthetic infant milk formulas incorporating taurine, or taurine and isethionic acid, or taurine and cholesterol, or taurine and isethionic acid and cholesterol in accordance with the practices of this invention would appear to provide an improved or superior nourishment to human infants, particularly pre-term infants. Instead of taurine, metabolizable derivatives thereof which yield taurine when fed to the infant may replace at least a portion of taurine per se. It is presently preferred, however, to employ taurine and not a derivative thereof.

Many synthetic infant milk formulas based on cow milk are known and all such infant milk formulas in addition to non-cow milk base synthetic milk formulas (with the exception of meat-based synthetic formulas) are improved by incorporating therein taurine, or taurine and isethionic acid, or taurine, isethionic acid and cholesterol, or taurine and cholesterol, all in minor amounts, particularly in the amounts set forth hereinabove.

One infant milk formula sold under the trade name ENFAMIL manufactured by Mead Johnson Laboratories of Mead Johnson & Company, Evansville, Ind., U.S.A., and hereinafter referred to as Formula A, which is improved by the incorporation therein of taurine, or taurine and isethionic acid, or taurine and cholesterol, or taurine, isethionic acid and cholesterol in accordance with this invention, contains the following homogenized and ready-to-use ingredients: Water, nonfat milk, lactose, soy and coconut oils, soy lecithin, carrageenan, vitamins (vitamin A palmitate, ergocalciferol, D-alpha-tocopheryl acetate, sodium ascorbate, folic acid, thiamine hydrochloride, riboflavin, niacinamide, pyridoxine hydrochloride, cyanocobalamin, and calcium pantothenate), and minerals (ferrous sulfate, cupric sulfate, zinc sulfate, and manganese sulfate).

| Proximate Analysis (% W/V) | 20 Kcal./fl. oz. |
| --- | --- |
| Protein | 1.5 |
| Fat | 3.7 |
| Carbohydrate | 7 |
| Minerals (ash) | 0.36 |
| Water | 87.5 |

Each quart of ENFAMIL formula (20 Kcal./fl. oz) supplies 640 kilocalories and the following vitamins and minerals:

|  | Per 100 Kcal. (5 fl. oz.) | Per Quart |
| --- | --- | --- |
| Vitamin A, I.U. | 250 | 1600 |
| Vitamin D, I.U. | 62.5 | 400 |
| Vitamin E, I.U. | 1.9 | 12 |
| Vitamin C (Ascorbic Acid), mg | 7.8 | 50 |
| Folic Acid (Folacin), mg | 0.016 | 0.1 |
| Thiamine (Vitamin $B_1$), mg | 0.08 | 0.5 |
| Riboflavin (Vitamin $B_2$), mg | 0.09 | 0.6 |
| Niacin, mg | 1.25 | 8 |
| Vitamin $B_6$, mg | 0.06 | 0.4 |
| Vitamin $B_{12}$, mcg | 0.31 | 2 |
| Pantothenic Acid, mg | 0.47 | 3 |
| Choline, mg | 7 | 45 |
| Calcium, mg | 81 | 520 |
| Phosphorus, mg | 69 | 440 |
| Iodine, mcg | 10 | 65 |
| Iron, mg | 0.2 | 1.4 |
| Magnesium, mg | 7 | 45 |
| Copper, mg | 0.09 | 0.6 |
| Zinc, mg | 0.63 | 4 |
| Manganese, mg | 0.16 | 1 |

Another infant milk formula sold under the trade name SIMILAC manufactured by Ross Laboratories, Columbus, Ohio, U.S.A., and hereinafter referred to as Formula B, which is improved by the incorporation therein of taurine, or taurine and isethionic acid, or taurine and cholesterol, or taurine, isethionic acid and cholesterol in accordance with this invention, contains the following homogenized and ready-to-use ingredients: Water, nonfat milk, lactose, soy, coconut and corn oils, mono- and diglycerides, soy lecithin, carrageenan, ascorbic acid, zinc sulfate, niacinamide, alpha-tocopheryl acetate, cupric sulfate, calcium pantothenate, vitamin A palmitate, thiamine chloride hydrochloride, pyridoxine hydrochloride, riboflavin, folic acid, manganous chloride, vitamin $D_3$ concentrate and cyanocobalamin.

| Approximate Analysis (wt/liter) | |
| --- | --- |
| Fat | 36.1 g |
| Carbohydrate | 72.3 g |
| Protein | 15.5 g |
| Minerals | 3.6 g |
| Calcium | 0.58 g |
| Phosphorus | 0.43 g |
| Magnesium | 41 mg |
| Iron | trace |

-continued

| | |
|---|---|
| Zinc | 5.0 mg |
| Copper | 0.41 mg |
| Iodine | 0.10 mg |
| Water | 902.0 g |
| *Calories per fl. oz. | 20 |
| Calories per 100 ml | 68 |
| Vitamins Per Liter | |
| Vitamin A | 2500 Int. Units |
| Vitamin D | 400 Int. Units |
| Vitamin E | 15 Int. Units |
| Vitamin C | 55 mg |
| Vitamin $B_1$ | 0.65 mg |
| Vitamin $B_2$ | 1 mg |
| Niacin (mg equiv) | 7 |
| Vitamin $B_6$ | 0.40 mg |
| Folic Acid | 50 mcg |
| Pantothenic Acid | 3 mg |
| Vitamin $B_{12}$ | 1.5 mcg |

*Special formulas substantially as described hereinabove may have a higher calorie content, e.g. 27-28 calories/oz. for premature infants.

Yet another infant milk formula sold under the trademark SMA manufactured by Wyeth Laboratories, Inc., Philadelphia, Pa., U.S.A., and available in concentrated liquid form or powder form, each of which provides 20 calories per ounce of normal dilution, and hereinafter referred to as Formula C, which is improved by the incorporation therein of taurine, or taurine and isethionic acid, or taurine and cholesterol, or taurine, isethionic acid and cholesterol in accordance with this invention, contains the following ingredients in homogenized and ready-to-use form: Water; nonfat milk; demineralized (electrodialyzed) whey; lactose; oleo, coconut, oleic (safflower), and soybean oils; soy lecithin; calcium carrageenan. Minerals: Potassium bicarbonate; calcium chloride and citrate; potassium chloride; sodium citrate; ferrous sulfate; sodium bicarbonate; zinc, cupric and manganese sulfates. Vitamins: Ascorbic acid, d-alpha tocopheryl acetate, niacinamide, vitamin A palmitate, calcium pantothenate, thiamine hydrochloride, riboflavin, pyridoxine hydrochloride, beta-carotene, folic acid, phytonadione, activated 7-dehydrocholesterol, cyanocobalamin.

| Proximate Analysis | (W/V) |
|---|---|
| Fat | 3.6% |
| Carbohydrate | 7.2% |
| Protein | 1.5% |
| 60% Lactalbumin (whey protein) | 0.9% |
| 40% Casein | 0.6% |
| Ash | 0.25% |
| Crude fiber | none |
| Total solids | 12.6% |
| *Calories/fl. oz. | 20 |
| Vitamins and Minerals (each quart contains): | |
| A | 2,500 I.U. |
| $D_3$ | 400 I.U. |
| E | 9 I.U. |
| $K_1$ | 55 mcg |
| $B_1$ (thiamine) | 0.67 mg |
| $B_2$ (riboflavin) | 1 mg |
| C (ascorbic acid) | 55 mg |
| $B_6$ | 0.4 mg |
| $B_{12}$ | 1 mcg |
| Niacin mg equivalents | 9.5 |
| Pantothenic acid | 2 mg |
| Folic acid | 50 mcg |
| Choline | 130 mg |
| Calcium | 420 mg |
| Phosphorus | 312 mg |
| Magnesium | 50 mg |
| Sodium | 142 mg |
| Potassium | 530 mg |
| Chloride | 350 mg |
| Iron | 12 mg |
| Copper | 0.45 mg |
| Zinc | 3.5 mg |
| Manganese | 150 mcg |
| Iodine | 65 mcg |

*Special formulas substantially as described hereinabove may have a higher calorie content, e.g. 27-28 calories/oz. for premature infants.

Specifications have been proposed for a standard infant milk formula which in the liquid form may be used either directly or diluted with water before feeding, as appropriate, or which in powdered form requires water for preparation. The proposed formula hereinafter referred to as Formula D, which is improved by the incorporation therein of taurine, or taurine and isethionic acid, or taurine and cholesterol, or taurine, isethionic acid and cholesterol in accordance with this invention, is considered to be nutritionally adequate to promote normal growth and development when properly used. Essentially, the composition of the proposed standard infant formula is a product based on cow's milk or other animals and/or on other edible constituents of animals, including fish, or plant origin, which have been proved to be suitable for infant feeding. The proposed infant formula contains, per 100 available calories or 100 kilojoules of intake, the following minimum and maximum levels of vitamins, minerals in an available form, choline, protein, fat and linoleate:

| | | Amounts per 100 Available Calories | | Amounts per 100 Available Kilojoules | |
|---|---|---|---|---|---|
| | | Minimum | Maximum | Minimum | Maximum |
| (a) | Vitamins Other Than Vitamin E | | | | |
| | Vitamin A | 250 I.U. or 75 μg expressed as retinol | 500 I.U. or 150 μg expressed as retinol | 60 I.U. or 18 μg expressed as retinol | 120 I.U. or 37 μg expressed as retinol |
| | Vitamin D | 40 I.U. | 80 I.U. | 10 I.U. | 19 I.U. |
| | Ascorbic Acid (Vitamin C) | 8 mg | none specified | 1.9 mg | none specified |
| | Thiamine (Vitamin $B_1$) | 40 μg | " | 10 μg | " |
| | Riboflavin (Vitamin $B_2$) | 60 μg | " | 14 μg | " |
| | Nicotinamide | 250 μg | " | 60 μg | " |
| | Vitamin $B_6$[1] | 35 μg | " | 9 μg | " |
| | Folic Acid | 4 μg | " | 1 μg | " |

-continued

|  | Amounts per 100 Available Calories | | Amounts per 100 Available Kilojoules | |
|---|---|---|---|---|
|  | Minimum | Maximum | Minimum | Maximum |
| Pantothenic Acid | 320 μg | " | 70 μg | " |
| Vitamin $B_{12}$ | 0.1 μg | " | 0.04 μg | " |
| Vitamin $K_1$ | 4 μg | " | 1 μg | " |
| Biotin (Vitamin H) | 1.5 μg | " | 0.4 μg | " |
| (b) Vitamin E (α-tocopherol compounds) | 0.7 I.U./g linoleic acid[2], but in no case less than 0.7 I.U./100 available calories | " | 0.7 I.U./g linoleic acid[2], but in no case less than 0.7 I.U./100 available kilojoules | " |
| (c) Minerals |  |  |  |  |
| Sodium (Na) | 20 mg | 60 mg | 5 mg | 15 mg |
| Potassium (K) | 80 mg | 200 mg | 20 mg | 50 mg |
| Chloride (Cl) | 55 mg | 150 mg | 14 mg | 35 mg |
| Calcium (Ca)[3] | 50 mg | none specified | 12 mg | none specified |
| Phosphorus (P)[3] | 25 mg | " | 6 mg | " |

[1]Formulas with a higher protein content than 1.8 g protein/100 calories should contain a minimum of 15 μg vitamin $B_6$ per gramme of protein.
[2]Or per g polyunsaturated fatty acids, expressed as linoleic acid.
[3]The Ca:P ratio shall be not less than 1.2 and not more than 2.0.

| Magnesium (Mg) | 6 mg | none specified | 1.4 mg | none specified |
|---|---|---|---|---|
| Iron (Fe) | 1 mg[1] | " | 0.25 mg[1] | " |
| Iron (Fe) | 0.15 mg | " | 0.04 mg | " |
| Iodine (I) | 5 μg | " | 1.2 μg | " |
| Copper (Cu) | 60 μg | " | 14 μg | " |
| Zinc (Zn) | 0.5 mg | " | 0.12 mg | " |
| Manganese (Mn) | 5 μg | " | 1.2 μg | " |
| (d) Choline | 7 mg | " | 1.7 mg | " |

[1]Products containing not less than 1 mg iron (Fe)/100 available calories shall be labelled "Infant Formula with Iron".

(e) Protein (i) Shall not be less than 1.8 g per 100 available calories (or 0.43 g per 100 available kilojoules) of protein of nutritional quality equivalent to that of casein or a greater quantity of other protein in proportion to its biological value. The quality of the protein shall not be less than 85% of that of casein. The total quantity of protein shall not be more than 4 g per 100 available calories (or 0.96 g per 100 available kilojoules). The minimum value set for quality and the maximum for quantity of the protein may be modified by national authorities according to their own regulations and/or local conditions.

(ii) Isolated amino acids may be added to infant formula only to improve its nutritional value for infants. Essential amino acids may be added to improve protein quality, only in amounts necessary for that purpose. Only natural L forms of amino acids shall be used.

(f) Fat and Linoleate

The formula shall contain linoleic acid (in the form of glycerides) at a level not less than 300 mg per 100 available calories (or 70 mg per 100 available kilojoules) and fat at a level not less than 3.3 g and not more than 6 g per 100 available calories (or not less than 0.8 g and not more than 1.5 g per 100 available kilojoules).

In addition to the vitamins and minerals listed hereinabove, food additives can be included, such as the following thickening agents, emulsifiers, pH adjusting agents and antioxidants, at the levels indicated:

|  | Maximum Level in 100 ml of the Ready-To-Drink Formula |
|---|---|
| Thickening Agents |  |
| Guar Gum | 0.1 g in all types of infant formula |
| Locust Bean Gum | 0.1 g in all types of infant formula |
| Distarch phosphate, singly or in combination | 0.5 g in soy-based infant formula only, in hydrolyzed protein and/or amino acid-based infant formula only |
| Acetylated distarch phosphate, singly or in combination | |
| Phosphated distarch phosphate, singly or in combination | 2.5 g in soy-based infant formula only, in hydrolyzed protein and/or amino acid-based infant formula only |
| Hydroxypropyl starch, singly or in combination | |
| Carrageenan | 0.03 g in regular, milk- and soy-based liquid infant formula only; 0.1 g in hydrolyzed protein and/or amino acid-based liquid infant formula only |
| Emulsifiers | |
| Lecithin | 0.5 g in all types of infant formula |
| Mono- and Di-glycerides | 0.4 g in all types of infant formula |
| pH-Adjusting Agents | |
| Sodium Hydrogen Carbonate | |
| Sodium Carbonate | |
| Potassium Hydrogen Carbonate | Limited by GMP (within the limits for Na and K above) in all types of infant formula |
| Potassium Carbonate | |
| Sodium Citrate | |
| Potassium Citrate | |
| L(+) Lactic Acid | Limited by GMP in all types of |

| | Maximum Level in 100 ml of the Ready-To-Drink Formula |
|---|---|
| | infant formula |
| L(+) Lactic Acid Producing Cultures | Limited by GMP in all types of infant formula |
| Citric Acid | Limited by GMP in all types of infant formula |
| Antioxidants | |
| Mixed Tocopherols Concentrate | 1 mg in all types of infant formula |
| L-Ascorbyl Palmitate | 1 mg in all types of infant formula |

The above-described proposed standard milk formula is a proposed formula of the Codex Committee of Foods for Special Dietary Uses.

Synthetic infant milk formulas based on Formula C described hereinabove and containing taurine in various concentrations were prepared. More particularly, taurine was incorporated in SMA infant milk formula (Formula C) at concentrations of 25 µmoles taurine/100 ml (3.13 mg/100 ml), 35 µmoles taurine/100 ml (4.38 mg/100 ml) and 45 µmoles taurine/100 ml (5.63 mg/100 ml). A control containing no added taurine was also employed. The taurine-containing SMA formulas and the control were then held at room temperature for an extended period of time. After 4½ and 6 months, the formulas were examined from the point of view of shelf life stability. No difference among the formulas tested was observed and all compositions or formulas were in good condition and unchanged. Similar formulas, including a control having no added taurine, were subjected to a regular shelf life study. In this study, the formulas were maintained at 80° F. The formulas were examined at 1½, 3 and 4 month intervals. Aside from the usual gravitation of a thin layer of fatty material (not free fat), there was no observable difference among the formulas relative to odor, color, pH or physical appearance and all formulas tested looked good. Based on the above results, it appears to be evident that no unusual effects should result from the addition of taurine at the levels tested to an infant milk formula having the composition of Formula C hereinabove, particularly SMA infant milk formula. It is mentioned that infant milk formulas having the composition set forth in Formulas A, B, C and D hereinabove showed no taurine content when tested for taurine.

As will be apparent to those skilled in the art in the light of the foregoing disclosure, many modifications, alterations and substitutions are possible without departing from the spirit or scope thereof.

I claim:

1. A synthetic infant milk formula containing as an additive thereto taurine at a concentration in the range from about 15 to about 60 µmoles percent, said formula being essentially free of taurine prior to addition of taurine thereto.

2. A synthetic infant milk formula in accordance with claim 1, wherein said infant milk formula contains cow milk protein.

3. A synthetic infant milk formula in accordance with claim 1 containing cow milk protein, the cow milk protein content of said formula being such that about 80% is derivable from casein and about 20% is derivable from whey.

4. A synthetic infant milk formula in accordance with claim 1 containing cow milk protein, the cow milk protein content of said formula being such that about 60% is derivable from whey and about 40% is derivable from casein.

5. A synthetic infant milk formula in accordance with claim 1 in ready-to-use liquid form.

6. A synthetic infant milk formula in accordance with claim 1 in ready-to-use liquid form containing taurine at a concentration of about 30 µmoles percent.

7. A synthetic infant milk formula in accordance with claim 1, wherein said infant milk formula contains soy protein.

8. A synthetic infant milk formula in accordance with claim 1 in dry or powder form for reconstitution with water for consumption such that when reconstituted the taurine content thereof is at a concentration in the range from about 15 to about 60 µmoles percent.

9. A synthetic infant milk formula in accordance with claim 1 in dry or powder form for reconstitution with water for consumption such that when reconstituted the taurine content thereof is about 30 µmoles percent.

10. A synthetic infant milk formula in accordance with claim 1 in concentrated liquid form for dilution with water prior to consumption such that when diluted with water for consumption the taurine content thereof is at a concentration in the range from about 15 to about 60 µmoles percent.

11. In the nourishment of an infant wherein the infant is nourished by a synthetic infant milk formula essentially free of taurine, the improvement which comprises adding taurine to said formula in an amount to provide taurine therein at a concentration in the range from about 15 to about 60 µmoles percent.

12. A method in accordance with claim 11 wherein said synthetic infant milk formula contains cow milk protein.

13. A method in accordance with claim 11 wherein said synthetic infant milk formula contains cow milk protein and wherein the cow milk protein present in said formula is such that about 80-82% by weight is derived from casein protein and about 18-20% by weight is derived from whey protein.

14. A method in accordance with claim 11 wherein said synthetic infant milk formula contains cow milk protein and wherein the cow milk protein present in said formula is such that about 40% by weight is derived from casein protein and about 60% by weight is derived from whey protein.

15. A method in accordance with claim 11 wherein said infant milk formula contains soy protein.

* * * * *